(12) United States Patent
Endo et al.

(10) Patent No.: US 8,736,743 B2
(45) Date of Patent: May 27, 2014

(54) COLOR IMAGING ELEMENT, IMAGING DEVICE, AND STORAGE MEDIUM STORING A CONTROL PROGRAM FOR IMAGING DEVICE

(71) Applicant: FUJIFILM Corporation, Tokyo (JP)

(72) Inventors: Hiroshi Endo, Saitama (JP); Takashi Aoki, Saitama (JP); Yoichi Iwasaki, Saitama (JP); Kazuki Inoue, Saitama (JP); Kenkichi Hayashi, Saitama (JP); Seiji Tanaka, Saitama (JP); Noriko Kawamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/034,004

(22) Filed: Sep. 23, 2013

(65) Prior Publication Data
US 2014/0022422 A1 Jan. 23, 2014

Related U.S. Application Data

(63) Continuation of application No. PCT/JP2012/056594, filed on Mar. 14, 2012.

(30) Foreign Application Priority Data

Mar. 24, 2011 (JP) .................. 2011-066631
Jul. 26, 2011 (JP) .................. 2011-163311
Dec. 28, 2011 (JP) .................. 2011-289042

(51) Int. Cl.
*H04N 5/232* (2006.01)
*G03B 13/00* (2006.01)

(52) U.S. Cl.
USPC ............ 348/349; 348/345; 348/280; 396/124

(58) Field of Classification Search
CPC .................................. H04N 5/3696
USPC .............. 348/349, 345, 222.1, 340, 294, 302, 348/280; 250/201.2; 396/124
See application file for complete search history.

(56) References Cited

U.S. PATENT DOCUMENTS 6,829,008 B1 12/2004 Kondo et al.
6,995,796 B2 2/2006 Taubman
(Continued)

FOREIGN PATENT DOCUMENTS

JP 8-23542 A 1/1996
JP 8-23543 A 1/1996
(Continued)

OTHER PUBLICATIONS

Notification of the First Office Action dated May 23, 2013, issued by the State Intellectual Property Office of P.R.C. in application No. 201180022503.3.

(Continued)

*Primary Examiner* — Paul Berardesca
(74) *Attorney, Agent, or Firm* — Birch, Stewart, Kolasch & Birch, LLP

(57) ABSTRACT

Interpolation precision of phase difference detection pixels is raised. An image pickup device includes: a color filter disposed with a repeating basic array pattern configured by 3×3 pixel square arrays of a first array pattern and a second array pattern disposed symmetrically about a point; a first phase difference detection pixel that is placed at a position of a pixel corresponding to 1 corner portion out of the 4 corner portions of at least one array pattern in 1 pair of the first array pattern and the second array pattern out of 2 pairs of the first array pattern and the second array pattern configuring the basic array pattern; and a second phase difference detection pixel that is placed at a position of a pixel corresponding to 1 corner portion out of the 4 corner portions in the array pattern, out of the first array pattern.

9 Claims, 19 Drawing Sheets

(56) References Cited

U.S. PATENT DOCUMENTS

| | | |
|---|---|---|
| 2002/0149686 A1 | 10/2002 | Taubman |
| 2004/0109068 A1 | 6/2004 | Mitsunaga et al. |
| 2004/0169747 A1 | 9/2004 | Ono et al. |
| 2006/0203113 A1 | 9/2006 | Wada et al. |
| 2007/0153104 A1 | 7/2007 | Ellis-Monaghan et al. |
| 2008/0131028 A1 | 6/2008 | Pillman et al. |
| 2008/0151083 A1 | 6/2008 | Hains et al. |
| 2009/0135289 A1 | 5/2009 | Kusaka |
| 2010/0091161 A1 | 4/2010 | Suzuki |
| 2010/0128152 A1 | 5/2010 | Hayasaka et al. |
| 2011/0069189 A1 | 3/2011 | Venkataraman et al. |
| 2012/0025060 A1 | 2/2012 | Iwata |

FOREIGN PATENT DOCUMENTS

| | | |
|---|---|---|
| JP | 11-285012 A | 10/1999 |
| JP | 2000-156823 A | 6/2000 |
| JP | 2000-308080 A | 11/2000 |
| JP | 2004-221839 A | 8/2004 |
| JP | 2004-266369 A | 9/2004 |
| JP | 3592147 B2 | 11/2004 |
| JP | 2005-136766 A | 5/2005 |
| JP | 2007-155929 A | 6/2007 |
| JP | 2007-184904 A | 7/2007 |
| JP | 2007-306490 A | 11/2007 |
| JP | 2008-236620 A | 10/2008 |
| JP | 2008-312073 A | 12/2008 |
| JP | 2009-89144 A | 4/2009 |
| JP | 2009-105682 A | 5/2009 |
| JP | 2010-66494 A | 3/2010 |
| JP | 2010-512048 A | 4/2010 |
| JP | 2010-153511 A | 7/2010 |
| JP | 2010-154493 A | 7/2010 |
| JP | 2011-523538 A | 8/2011 |
| WO | WO 02/056604 A1 | 7/2002 |
| WO | WO 2008/066698 A2 | 6/2008 |
| WO | WO 2009/151903 A2 | 12/2009 |

OTHER PUBLICATIONS

PCT/ISA/210—International Search Report mailed on Apr. 24, 2012, issued in PCT/JP2012/056594.

PCT/ISA/237—Written Opinion of the International Searching Authority mailed on Apr. 24, 2012, issued in PCT/JP2012/056594.

Written Opinion of the International Searching Authority mailed on Jan. 15, 2013 issued in PCT/JP2012/080899.

Written Opinion of the International Searching Authority mailed on Jan. 15, 2013 issued in PCT/JP2012/081644.

Written Opinion of the International Searching Authority mailed on Jan. 22, 2013 issued in PCT/JP2012/080898.

Written Opinion of the International Searching Authority mailed on Jan. 29, 2013 issued in PCT/JP2012/083583.

FIG.3

FIG.5A
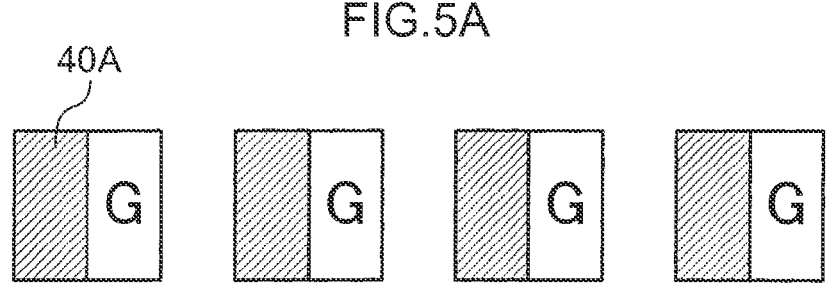
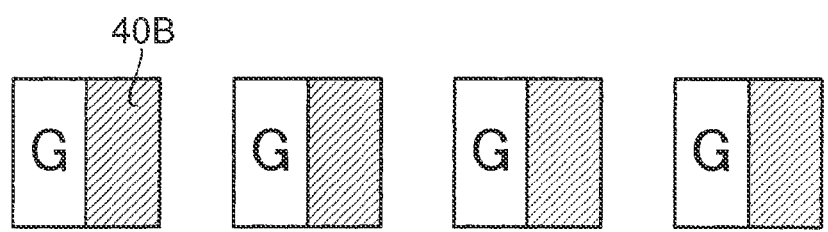
FIG.5B
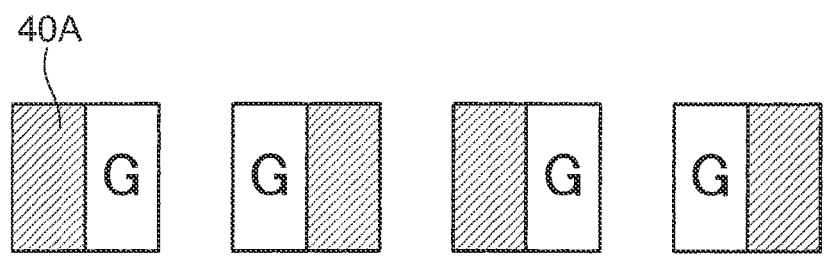
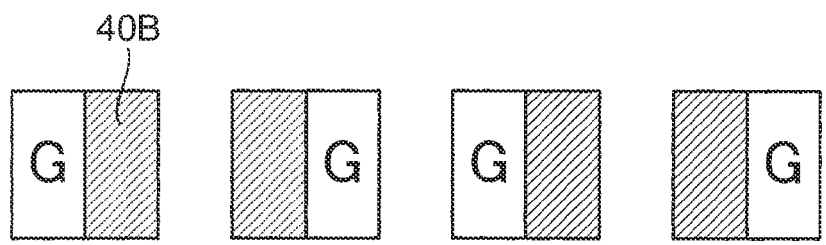

FIG.6

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | G | R | G | G | B | G | G | R | G | G | B | G | G | R | G | G | B | G | G | R | G | G | B | G |
| 2 | B | G | B | R | G | R | B | G | B | R | G | R | B | G | B | R | G | R | B | G | B | R | G | R |
| 3 | G | R | G | G | B | G | G | R | G | G | B | G | G | R | G | G | B | G | G | R | G | G | B | G |
| 4 | G | B | G | G | R | G | G | B | G | G | R | G | G | B | G | G | R | G | G | B | G | G | R | G |
| 5 | R | G | R | B | G | B | R | G | R | B | G | B | R | G | R | B | G | B | R | G | R | B | G | B |
| 6 | G | B | G | G | R | G | G | B | G | G | R | G | G | B | G | G | R | G | G | B | G | G | R | G |
| 7 | G | R | G | G | B | G | G | R | G | G | B | G | G | R | G | G | B | G | G | R | G | G | B | G |
| 8 | B | G | B | R | G | R | B | G | B | R | G | R | B | G | B | R | G | R | B | G | B | R | G | R |
| 9 | G | R | G | G | B | G | G | R | G | G | B | G | G | R | G | G | B | G | G | R | G | G | B | G |
| 10 | G | B | G | G | R | G | G | B | G | G | R | G | G | B | G | G | R | G | G | B | G | G | R | G |
| 11 | R | G | R | B | G | B | R | G | R | B | G | B | R | G | R | B | G | B | R | G | R | B | G | B |
| 12 | G | B | G | G | R | G | G | B | G | G | R | G | G | B | G | G | R | G | G | B | G | G | R | G |
| 13 | G | R | G | G | B | G | G | R | G | G | B | G | G | R | G | G | B | G | G | R | G | G | B | G |
| 14 | B | G | B | R | G | R | B | G | B | R | G | R | B | G | B | R | G | R | B | G | B | R | G | R |
| 15 | G | R | G | G | B | G | G | R | G | G | B | G | G | R | G | G | B | G | G | R | G | G | B | G |
| 16 | G | B | G | G | R | G | G | B | G | G | R | G | G | B | G | G | R | G | G | B | G | G | R | G |
| 17 | R | G | R | B | G | B | R | G | R | B | G | B | R | G | R | B | G | B | R | G | R | B | G | B |
| 18 | G | B | G | G | R | G | G | B | G | G | R | G | G | B | G | G | R | G | G | B | G | G | R | G |
| 19 | G | R | G | G | B | G | G | R | G | G | B | G | G | R | G | G | B | G | G | R | G | G | B | G |
| 20 | B | G | B | R | G | R | B | G | B | R | G | R | B | G | B | R | G | R | B | G | B | R | G | R |
| 21 | G | R | G | G | B | G | G | R | G | G | B | G | G | R | G | G | B | G | G | R | G | G | B | G |
| 22 | G | B | G | G | R | G | G | B | G | G | R | G | G | B | G | G | R | G | G | B | G | G | R | G |
| 23 | R | G | R | B | G | B | R | G | R | B | G | B | R | G | R | B | G | B | R | G | R | B | G | B |
| 24 | G | B | G | G | R | G | G | B | G | G | R | G | G | B | G | G | R | G | G | B | G | G | R | G |

|    | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|----|---|---|---|---|---|---|---|---|---|----|----|----|----|----|----|----|----|----|----|----|----|----|----|----|
| 1  | G | R | G | G | G | B | G | G | R | G  | B  | G  | G  | R  | G  | G  | B  | G  | G  | R  | G  | G  | B  | G  |
| 2  | B | G | B | R | G | R | B | G | B | R  | G  | R  | B  | G  | B  | R  | G  | R  | B  | G  | B  | R  | G  | R  |
| 3  | G | R | G | G | B | G | G | R | G | G  | B  | G  | G  | R  | G  | G  | B  | G  | G  | R  | G  | G  | B  | G  |
| 4  | G | B | G | G | R | G | G | B | G | G  | R  | G  | G  | B  | G  | G  | R  | G  | G  | B  | G  | G  | R  | G  |
| 5  | R | G | R | B | G | B | R | G | R | B  | G  | B  | R  | G  | R  | B  | G  | B  | R  | G  | R  | B  | G  | B  |
| 6  | G | B | G | G | R | G | G | B | G | G  | R  | G  | G  | B  | G  | G  | R  | G  | G  | B  | G  | G  | R  | G  |
| 7  | G | R | G | G | B | G | G | R | G | G  | B  | G  | G  | R  | G  | G  | B  | G  | G  | R  | G  | G  | B  | G  |
| 8  | B | G | B | R | G | R | B | G | B | R  | G  | R  | B  | G  | B  | R  | G  | R  | B  | G  | B  | R  | G  | R  |
| 9  | G | R | G | G | B | G | G | R | G | G  | B  | G  | G  | R  | G  | G  | B  | G  | G  | R  | G  | G  | B  | G  |
| 10 | G | B | G | G | R | G | G | B | G | G  | R  | G  | G  | B  | G  | G  | R  | G  | G  | B  | G  | G  | R  | G  |
| 11 | R | G | R | B | G | B | R | G | R | B  | G  | B  | R  | G  | R  | B  | G  | B  | R  | G  | R  | B  | G  | B  |
| 12 | G | B | G | G | R | G | G | B | G | G  | R  | G  | G  | B  | G  | G  | R  | G  | G  | B  | G  | G  | R  | G  |
| 13 | G | R | G | G | B | G | G | R | G | G  | B  | G  | G  | R  | G  | G  | B  | G  | G  | R  | G  | G  | B  | G  |
| 14 | B | G | B | R | G | R | B | G | B | R  | G  | R  | B  | G  | B  | R  | G  | R  | B  | G  | B  | R  | G  | R  |
| 15 | G | R | G | G | B | G | G | R | G | G  | B  | G  | G  | R  | G  | G  | B  | G  | G  | R  | G  | G  | B  | G  |
| 16 | G | B | G | G | R | G | G | B | G | G  | R  | G  | G  | B  | G  | G  | R  | G  | G  | B  | G  | G  | R  | G  |
| 17 | R | G | R | B | G | B | R | G | R | B  | G  | B  | R  | G  | R  | B  | G  | B  | R  | G  | R  | B  | G  | B  |
| 18 | G | B | G | G | R | G | G | B | G | G  | R  | G  | G  | B  | G  | G  | R  | G  | G  | B  | G  | G  | R  | G  |
| 19 | G | R | G | G | B | G | G | R | G | G  | B  | G  | G  | R  | G  | G  | B  | G  | G  | R  | G  | G  | B  | G  |
| 20 | B | G | B | R | G | R | B | G | B | R  | G  | R  | B  | G  | B  | R  | G  | R  | B  | G  | B  | R  | G  | R  |
| 21 | G | R | G | G | B | G | G | R | G | G  | B  | G  | G  | R  | G  | G  | B  | G  | G  | R  | G  | G  | B  | G  |
| 22 | G | B | G | G | R | G | G | B | G | G  | R  | G  | G  | B  | G  | G  | R  | G  | G  | B  | G  | G  | R  | G  |
| 23 | R | G | R | B | G | B | R | G | R | B  | G  | B  | R  | G  | R  | B  | G  | B  | R  | G  | R  | B  | G  | B  |
| 24 | G | B | G | G | R | G | G | B | G | G  | R  | G  | G  | B  | G  | G  | R  | G  | G  | B  | G  | G  | R  | G  |

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | G | R | G | G | B | G | G | R | G | G | B | G | G | R | G | G | B | G | G | R | G | G | B | G |
| 2 | B | G | B | R | G | R | B | G | B | R | G | R | B | G | B | R | G | R | B | G | B | R | G | R |
| 3 | G | R | G | G | B | G | G | R | G | G | B | G | G | R | G | G | B | G | G | R | G | G | B | G |
| 4 | G | B | G | G | R | G | G | B | G | G | R | G | G | B | G | G | R | G | G | B | G | G | R | G |
| 5 | R | G | R | B | G | B | R | G | R | B | G | B | R | G | R | B | G | B | R | G | R | B | G | B |
| 6 | G | B | G | G | R | G | G | B | G | G | R | G | G | B | G | G | R | G | G | B | G | G | R | G |
| 7 | G | R | G | G | B | G | G | R | G | G | B | G | G | R | G | G | B | G | G | R | G | G | B | G |
| 8 | B | G | B | R | G | R | B | G | B | R | G | R | B | G | B | R | G | R | B | G | B | R | G | R |
| 9 | G | R | G | G | B | G | G | R | G | G | B | G | G | R | G | G | B | G | G | R | G | G | B | G |
| 10 | G | B | G | G | R | G | G | B | G | G | R | G | G | B | G | G | R | G | G | B | G | G | R | G |
| 11 | R | G | R | B | G | B | R | G | R | B | G | B | R | G | R | B | G | B | R | G | R | B | G | B |
| 12 | G | B | G | G | R | G | G | B | G | G | R | G | G | B | G | G | R | G | G | B | G | G | R | G |
| 13 | G | R | G | G | B | G | G | R | G | G | B | G | G | R | G | G | B | G | G | R | G | G | B | G |
| 14 | B | G | B | R | G | R | B | G | B | R | G | R | B | G | B | R | G | R | B | G | B | R | G | R |
| 15 | G | R | G | G | B | G | G | R | G | G | B | G | G | R | G | G | B | G | G | R | G | G | B | G |
| 16 | G | B | G | G | R | G | G | B | G | G | R | G | G | B | G | G | R | G | G | B | G | G | R | G |
| 17 | R | G | R | B | G | B | R | G | R | B | G | B | R | G | R | B | G | B | R | G | R | B | G | B |
| 18 | G | B | G | G | R | G | G | B | G | G | R | G | G | B | G | G | R | G | G | B | G | G | R | G |
| 19 | G | R | G | G | B | G | G | R | G | G | B | G | G | R | G | G | B | G | G | R | G | G | B | G |
| 20 | B | G | B | R | G | R | B | G | B | R | G | R | B | G | B | R | G | R | B | G | B | R | G | R |
| 21 | G | R | G | G | B | G | G | R | G | G | B | G | G | R | G | G | B | G | G | R | G | G | B | G |
| 22 | G | B | G | G | R | G | G | B | G | G | R | G | G | B | G | G | R | G | G | B | G | G | R | G |
| 23 | R | G | R | B | G | B | R | G | R | B | G | B | R | G | R | B | G | B | R | G | R | B | G | B |
| 24 | G | B | G | G | R | G | G | B | G | G | R | G | G | B | G | G | R | G | G | B | G | G | R | G |

|   | 1 | 2 | 3 | 4 | 5 | 6 | 7 | 8 | 9 | 10 | 11 | 12 |
|---|---|---|---|---|---|---|---|---|---|---|---|---|
| 1 | G | R | G | G | B | G | G | R | G | G | B | G |
| 2 | B | G | B | R | G | R | B | G | B | R | G | R |
| 3 | G | R | G | G | B | G | G | R | G | G | B | G |
| 4 | G | B | G | G | R | G | G | B | G | G | R | G |
| 5 | R | G | R | B | G | B | R | G | R | B | G | B |
| 6 | G | B | G | G | R | G | G | B | G | G | R | G |
| 7 | G | R | G | G | B | G | G | R | G | G | B | G |
| 8 | B | G | B | R | G | R | B | G | B | R | G | R |
| 9 | G | R | G | G | B | G | G | R | G | G | B | G |
| 10 | G | B | G | G | R | G | G | B | G | G | R | G |
| 11 | R | G | R | B | G | B | R | G | R | B | G | B |
| 12 | G | B | G | G | R | G | G | B | G | G | R | G |
| 13 | G | R | G | G | B | G | G | R | G | G | B | G |
| 14 | B | G | B | R | G | R | B | G | B | R | G | R |
| 15 | G | R | G | G | B | G | G | R | G | G | B | G |
| 16 | G | B | G | G | R | G | G | B | G | G | R | G |
| 17 | R | G | R | B | G | B | R | G | R | B | G | B |
| 18 | G | B | G | G | R | G | G | B | G | G | R | G |
| 19 | G | R | G | G | B | G | G | R | G | G | B | G |
| 20 | B | G | B | R | G | R | B | G | B | R | G | R |
| 21 | G | R | G | G | B | G | G | R | G | G | B | G |
| 22 | G | B | G | G | R | G | G | B | G | G | R | G |
| 23 | R | G | R | B | G | B | R | G | R | B | G | B |
| 24 | G | B | G | G | R | G | G | B | G | G | R | G |

FIG.16

|   | 1 | 2 | 3 | 4 | 5 | 6 | 7 | 8 | 9 | 10 | 11 | 12 |
|---|---|---|---|---|---|---|---|---|---|---|---|---|
| 1 | G | R | G | G | B | G | G | R | G | G | B | G |
| 2 | B | G | B | R | G | R | B | G | B | R | G | R |
| 3 | G | R | G | G | B | G | G | R | G | G | B | G |
| 4 | G | B | G | G | R | G | G | B | G | G | R | G |
| 5 | R | G | R | B | G | B | R | G | R | B | G | B |
| 6 | G | B | G | G | R | G | G | B | G | G | R | G |
| 7 | G | R | G | G | B | G | G | R | G | G | B | G |
| 8 | B | G | B | R | G | R | B | G | B | R | G | R |
| 9 | G | R | G | G | B | G | G | R | G | G | B | G |
| 10 | G | B | G | G | R | G | G | B | G | G | R | G |
| 11 | R | G | R | B | G | B | R | G | R | B | G | B |
| 12 | G | B | G | G | R | G | G | B | G | G | R | G |

|   | 1 | 2 | 3 | 4 | 5 | 6 | 7 | 8 | 9 | 10 | 11 | 12 |
|---|---|---|---|---|---|---|---|---|---|----|----|----|
| 1 | G | R | G | G | B | G | G | R | G | G | B | G |
| 2 | B | G | B | R | G | R | B | G | B | R | G | R |
| 3 | G | G | R | G | G | B | G | G | R | G | G | B | G |
| 4 | G | B | G | G | R | G | G | B | G | G | R | G |
| 5 | R | G | R | B | G | B | R | G | R | B | G | B |
| 6 | G | B | G | G | R | G | G | B | G | G | R | G |
| 7 | G | R | G | G | B | G | G | R | G | G | B | G |
| 8 | B | G | B | R | G | R | B | G | B | R | G | R |
| 9 | G | R | G | G | B | G | G | R | G | G | B | G |
| 10 | G | B | G | G | R | G | G | B | G | G | R | G |
| 11 | R | G | R | B | G | B | R | G | R | B | G | B |
| 12 | G | B | G | G | R | G | G | B | G | G | R | G |

40A (columns 1, 4)
40B (columns 1, 4)

FIG.18

|  | 40A<br>1 | 2 | 3 | 40A<br>4 | 5 | 6 | 7 | 8 | 9 | 10 | 11 | 12 |
|---|---|---|---|---|---|---|---|---|---|---|---|---|
| 1 | G | R | G | G | B | G | G | R | G | G | B | G |
| 2 | B | G | B | R | G | R | B | G | B | R | G | R |
| 3 | G | R | G | G | B | G | G | R | G | G | B | G |
| 4 | ▨G | B | G | ▨G | R | G | ▨G | B | G | ▨G | R | G |
| 5 | R | G | R | B | G | B | R | G | R | B | G | B |
| 6 | G | B | G | G | R | G | G | B | G | G | R | G |
| 7 | G | R | G | G | B | G | G | R | G | G | B | G |
| 8 | B | G | B | R | G | R | B | G | B | R | G | R |
| 9 | G | R | G | G | B | G | G | R | G | G | B | G |
| 10 | G▨ | B | G | G▨ | R | G | G▨ | B | G | G▨ | R | G |
| 11 | R | G | R | B | G | B | R | G | R | B | G | B |
| 12 | G | B | G | G | R | G | G | B | G | G | R | G |

COLOR IMAGING ELEMENT, IMAGING DEVICE, AND STORAGE MEDIUM STORING A CONTROL PROGRAM FOR IMAGING DEVICE

CROSS-REFERENCE TO RELATED APPLICATIONS

This application is a continuation application of International Application No. PCT/JP2012/056594, filed Mar. 14, 2012, the disclosure of which is incorporated herein by reference in its entirety. Further, this application claims priority from Japanese Patent Application No. 2011-066631, filed Mar. 24, 2011, Japanese Patent Application No. 2011-163311, filed Jul. 26, 2011, and Japanese Patent Application No. 2011-289042, filed Dec. 28, 2011.

BACKGROUND

1. Technical Field

The present invention relates to a color image pickup device, an imaging apparatus and a control program for an imaging apparatus, and in particular to a color image pickup device that includes phase difference detection pixels and to an imaging apparatus and a control program for an imaging apparatus of the same.

2. Related Art

For solid state image pickup devices installed in imaging apparatuses such as digital cameras, there are those that, in order to raise Auto Focus (AF) performance have phase difference detection pixels as a portion of the pixels out of many pixels formed on the solid state image pickup device light receiving surface (see for example Patent Documents 1 to 7).

The phase difference detection pixels are, for example similarly to the Patent Documents 1 to 7 listed below, configured by 2 nearby pixels mounted with the same color filter to form pairs, and are provided with light-blocking film openings that are respectively smaller than the light-blocking film openings provided to normal pixels. Moreover, the light-blocking film opening provided to one of the phase difference detection pixels configuring a pair is provided eccentrically in a separation direction (for example on the left side) from the other phase difference detection pixel, and the light-blocking film opening of the other phase difference detection pixel is provided eccentrically in the opposite direction (for example on the right side).

During AF operation in an imaging apparatus, the signals are read from the phase difference detection pixels of the solid state image pickup device, a focal point shift amount is derived from the detection signal of the pixel with light-blocking film opening eccentrically placed on the right side, and the detection signal of the pixel with the light-blocking film opening eccentrically placed on the left side, and the focal position of the imaging lens is adjusted.

The precision of such AF operation is higher the more there are of the phase difference detection pixels, however during main image capture of a normal subject image, the phase difference detection pixels have narrower light-blocking film openings and lower sensitivity, and hence there is the issue that they cannot be treated in the same way as normal pixels.

Accordingly, during reading out signals from all the pixels and generating a subject image, there is a need to gain correct detection signals from the phase difference detection pixels to a similar level to the sensitivity of the normal pixels, or to treat the phase difference detection pixels as missing pixels and to perform interpolation computation correction using the detection signals of peripheral normal pixels.

Patent Documents

Patent Document 1 Japanese Patent Application Laid-Open (JP-A) No. 2000-156823
Patent Document 2 JP-A No. 2007-155929
Patent Document 3 JP-A No. 2009-89144
Patent Document 4 JP-A No. 2009-105682
Patent Document 5 JP-A No. 2010-66494
Patent Document 6 JP-A No. 2008-312073
Patent Document 7 Japanese Patent No. 3592147

With phase difference detection pixels, in cases in which interpolation computation correction is performed with detection signals of peripheral normal pixels, sometimes there is a deterioration in the precision of interpolation and a deterioration in image quality depending on the position of the phase difference detection pixels.

SUMMARY

The present invention addresses the above issues, and an object thereof is to provide a color image pickup device, an imaging apparatus, and a control program for such an imaging apparatus that enable interpolation precision of phase difference detection pixels to be raised.

In order to address the above issues, a color image pickup device of the present invention includes: an image pickup device including plural photoelectric conversion elements arrayed in a horizontal direction and a vertical direction; a color filter that is provided above plural pixels configured by the plural photoelectric conversion elements, the color filter having repeatedly disposed 6×6 pixel basic array patterns configured with a first array pattern and a second array pattern disposed symmetrically about a point, wherein the first array pattern has a first filter corresponding to a first color that contributes most to obtaining a brightness signal placed at the 4 corner and center pixels of a 3×3 pixel square array, a second filter corresponding to a second color different from the first color placed in a line at the horizontal direction center of the square array, and a third filter corresponding to a third color different from the first color and the second color placed in a line at the vertical direction center of the square array, and the second array pattern has the same placement of the first filter as that in the first array pattern and has the placement of the second filter and the placement of the third filter swapped over to that of the first array pattern; a first phase difference detection pixel that is placed at a position of a pixel corresponding to 1 corner portion out of the 4 corner portions of at least one array pattern in 1 pair of the first array pattern and the second array pattern out of 2 pairs of the first array pattern and the second array pattern configuring the basic array pattern; and a second phase difference detection pixel that is placed at a position of a pixel corresponding to 1 corner portion out of the 4 corner portions in the array pattern, out of the first array pattern and the second array pattern configuring a basic array pattern that is adjacent in the vertical direction to the basic array pattern placed with the first phase difference detection pixel, that is the array pattern disposed in the same horizontal direction position to the array pattern placed with the first phase difference detection pixel.

According to this invention, configuration includes the first phase difference detection pixel that is placed at a position of a pixel corresponding to 1 corner portion out of the 4 corner portions of at least one array pattern in 1 pair of the first array pattern and the second array pattern, and the second phase difference detection pixel that is placed at a position of the pixel corresponding to 1 corner portion out of the 4 corner portions in the array pattern, out of the first array pattern and the second array pattern configuring a basic array pattern that is adjacent in the vertical direction to the basic array pattern placed with the first phase difference detection pixel, that is the array pattern disposed in the same horizontal direction position to the array pattern placed with the first phase difference detection pixel, thereby enabling interpolation precision for the phase difference detection pixels to be raised.

Note that configuration may be made such that the horizontal direction positions of the first phase difference detection pixel and the second phase difference detection pixel are the same as each other.

According to this invention, the horizontal direction positions of the first phase difference detection pixel and the second phase difference detection pixel are the same as each other, and so the AF precision using the phase difference detection pixels can be raised.

Moreover, configuration may be made such that the first phase difference detection pixel is placed in a corner portion at one vertical direction side out of the 4 corner portions, and the second phase difference detection pixel is placed in a corner portion at the other vertical direction side out of the 4 corner portions.

According to this invention, the AF precision using the phase difference detection pixels can be raised due to the first phase difference detection pixel and the second phase difference detection pixel being closer together in the vertical direction.

Note that configuration may be made such that a first light-blocking film is provided to the first phase difference detection pixel to block light to a region that is a part of the pixel and to let light through to other regions, and a second light-blocking film is provided to the second phase difference detection pixel to block light to part of the pixel and to let light pass through in a region that forms a pair with the light-pass region of the first light-blocking film.

Moreover, configuration may be made such that the first light-blocking film blocks light to a pixel horizontal direction left half region, and the second light-blocking film blocks light to a pixel horizontal direction right half region.

Moreover, configuration may be made such that the first color is green (G), the second color is one color of red (R) or blue (B), and the third color is the other color of red (R) or blue (B).

An imaging apparatus of the present invention includes: the color image pickup device; a drive section that drives the color image pickup device so as to read phase difference detection pixel data from the first phase difference detection pixel and the second phase difference detection pixel and so as to read pixel data for an image from pixels on the vertical direction even numbered lines in cases in which the first phase difference detection pixel and the second phase difference detection pixel are placed on the vertical direction odd numbered lines, and so as to read pixel data for an image from pixels on the vertical direction odd numbered lines in cases in which the first phase difference detection pixel and the second phase difference detection pixel are placed on the vertical direction even numbered lines; and a focus adjustment section that adjusts focus based on the phase difference detection pixel data.

In the present invention, the drive section drives the color image pickup device so as to read pixel data for an image from pixels on the horizontal direction even numbered lines in cases in which the first phase difference detection pixel and the second phase difference detection pixel are placed on the horizontal direction odd numbered lines, and so as to read pixel data for an image from pixels on the horizontal direction odd numbered lines in cases in which the first phase difference detection pixel and the second phase difference detection pixel are placed on the horizontal direction even numbered lines.

A control program of the imaging apparatus of the present invention is a control program that causes processing to be executed in a computer to control an imaging apparatus equipped with a color image pickup device including: an image pickup device including plural photoelectric conversion elements arrayed in a horizontal direction and a vertical direction, a color filter that is provided above plural pixels configured by the plural photoelectric conversion elements, the color filter having repeatedly disposed 6×6 pixel basic array patterns configured with a first array pattern and a second array pattern disposed symmetrically about a point, wherein the first array pattern has a first filter corresponding to a first color that contributes most to obtaining a brightness signal placed at the 4 corner and center pixels of a 3×3 pixel square array, a second filter corresponding to a second color different from the first color placed in a line at the horizontal direction center of the square array, and a third filter corresponding to a third color different from the first color and the second color placed in a line at the vertical direction center of the square array, and the second array pattern has the same placement of the first filter as that in the first array pattern and has the placement of the second filter and the placement of the third filter swapped over to that of the first array pattern; a first phase difference detection pixel that is placed at a position of a pixel corresponding to 1 corner portion out of the 4 corner portions of at least one array pattern in 1 pair of the first array pattern and the second array pattern out of 2 pairs of the first array pattern and the second array pattern configuring the basic array pattern; and a second phase difference detection pixel that is placed at a position of a pixel corresponding to 1 corner portion out of the 4 corner portions in the array pattern, out of the first array pattern and the second array pattern configuring a basic array pattern that is adjacent in the vertical direction to the basic array pattern placed with the first phase difference detection pixel, that is the array pattern disposed in the same horizontal direction position to the array pattern placed with the first phase difference detection pixel. Wherein the processing of the control program for the imaging apparatus includes driving the color image pickup device so as to read phase difference detection pixel data from the first phase difference detection pixel and the second phase difference detection pixel, and adjusting focus based on the phase difference detection pixel data.

Advantageous Effects of Invention

According to the present invention, the advantageous effect is exhibited of enabling the interpolation precision for phase difference detection pixels to be raised.

BRIEF DESCRIPTION OF DRAWINGS

FIG. 3 is a diagram illustrating light-blocking portion placement according to a first exemplary embodiment.

FIG. 5A is a diagram to explain a placement pattern of light-blocking film.

FIG. 5B is a diagram to explain a placement pattern of light-blocking film.

FIG. 6 is a diagram illustrating light-blocking portion placement according to a second exemplary embodiment.

FIG. 7 is a diagram illustrating light-blocking portion placement according to a third exemplary embodiment.

FIG. 8 is a diagram illustrating light-blocking portion placement according to a fourth exemplary embodiment.

FIG. 9 is a diagram illustrating light-blocking portion placement according to a fifth exemplary embodiment.

FIG. 10 is a diagram illustrating light-blocking portion placement according to a sixth exemplary embodiment.

FIG. 14 is a diagram to explain a case in which pixel data of phase difference detection pixels is corrected by average value correction.

FIG. 15 is a diagram illustrating light-blocking portion placement according to an eighth exemplary embodiment.

FIG. 16 is a diagram illustrating a modified example of light-blocking portion placement according to the eighth exemplary embodiment.

FIG. 17 is a diagram illustrating a modified example of light-blocking portion placement according to the eighth exemplary embodiment.

FIG. 18 is a diagram illustrating a modified example of light-blocking portion placement according to the eighth exemplary embodiment.

FIG. 19 is a diagram illustrating a modified example of light-blocking portion placement according to the eighth exemplary embodiment.

DESCRIPTION OF EMBODIMENTS

Explanation follows regarding exemplary embodiments of the present invention, with reference to the drawings.

First Exemplary Embodiment

Figure 1:
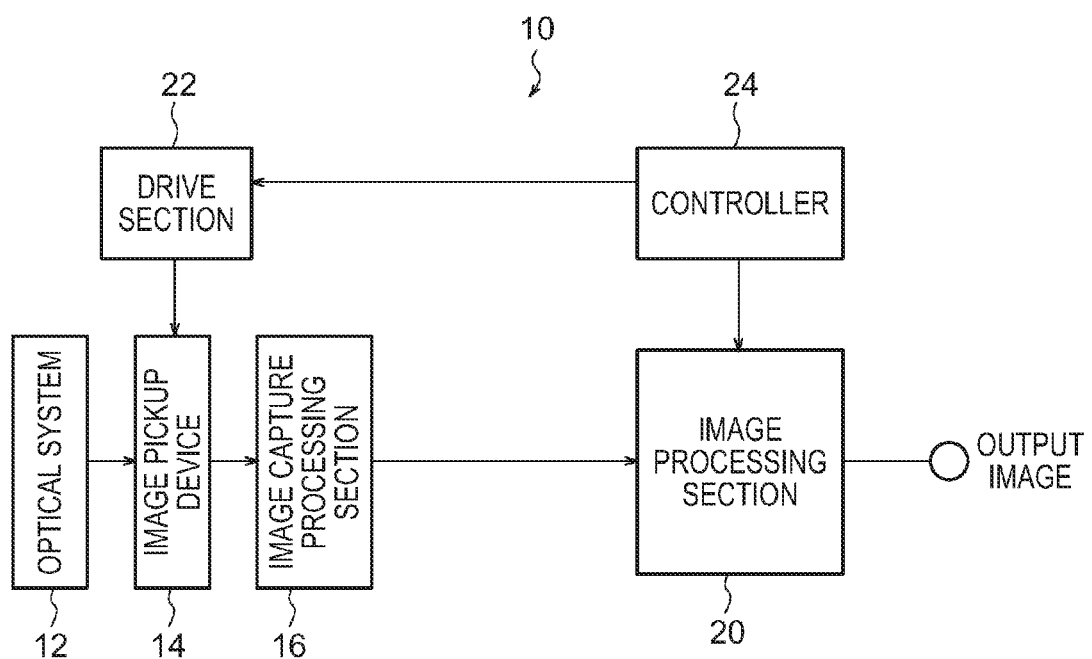
FIG. 1 is a schematic block diagram of an imaging apparatus.

FIG. 1 is a schematic block diagram illustrating an imaging apparatus 10 according to the present exemplary embodiment. The imaging apparatus 10 is configured including an optical system 12, an image pickup device 14, an image capture processing section 16, an image processing section 20, a drive section 22, and a controller 24.

The optical system 12 is configured including for example a lens set configured from plural optical lenses, an aperture adjustment mechanism, a zoom mechanism, and an automatic focusing mechanism.

The image pickup device 14 is what is referred to as a 1-chip image pickup device configured by an image pickup device, such as for example a Charge Coupled Device (CCD) or a Complementary Metal Oxide Semiconductor (CMOS) containing plural photoelectric conversion elements arrayed in the horizontal direction and vertical direction, with a color filter disposed above the image pickup device.

Figure 2:
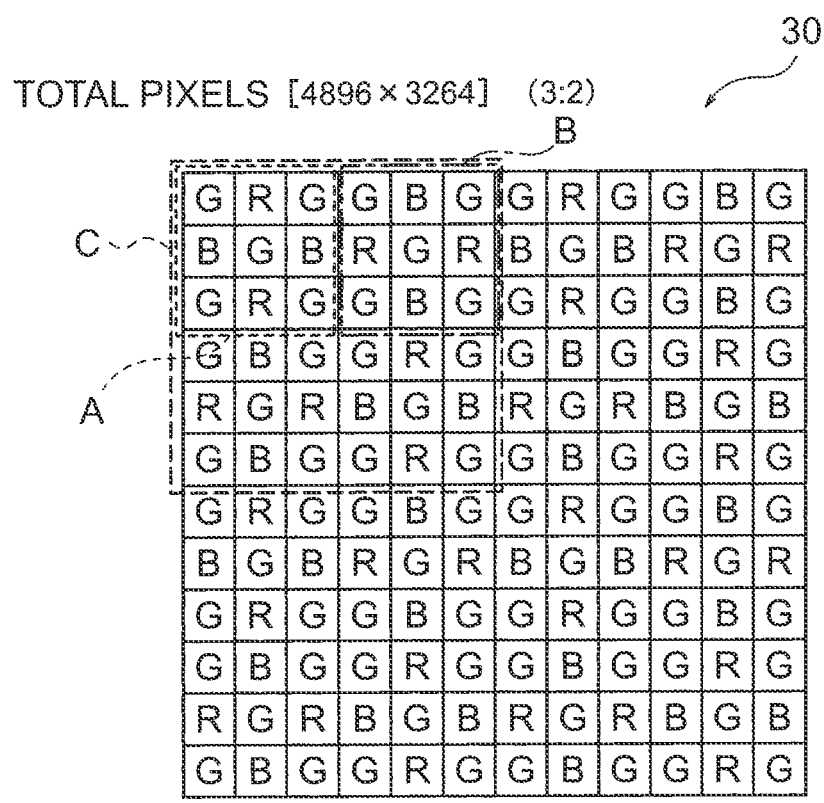
FIG. 2 is a configuration diagram of a color filter according to the present invention.

FIG. 2 illustrates a portion of a color filter 30 according to the present invention. Note that (4896×3264) pixels are provided as an example of the number of pixels with an aspect ratio of 3:2, however there is no limitation to such a number of pixels and aspect ratio. As illustrated in the drawing, the color filter 30 is a color filter having a repeatedly disposed 6×6 pixel basic array pattern C configured with a first array pattern A and a second array pattern B disposed symmetrically about a point, wherein the first array pattern A has a first filter G (referred to below as G filter) corresponding to G (green) that contributes most to obtaining a brightness signal placed at the 4 corner and center pixels of a 3×3 pixel square array, a second filter R (referred to below as R filter) corresponding to R (red) placed in the line at the horizontal direction center of the square array, and a third filter B (referred to below as B filter) corresponding to B (blue) placed in the line at the vertical direction center of the square array, and the second array pattern B has the same placement of the filter G as that of the first array pattern A and has the placement of the filter R and the placement of the B filter swapped over thereto.

Namely, the color filter 30 has the following features (1), (2), (3), (4) and (5).

Feature (1)

The color filter 30 illustrated in FIG. 2 includes the basic array pattern C formed from square placement patterns corresponding to 6×6 pixels, with the basic array pattern C disposed so as to repeat in both the horizontal direction and the vertical direction. Namely, the color filter array is an array in which each of the filters R, G, B (the R filter, G filter, B filter) has a specific periodicity.

Arraying the R filter, G filter and B filter thus with such a specific periodicity, enables processing to be performed in a repeating pattern such as during synchronization (interpolation) processing (also called demosaicing) of R, G, B signals read from the color image pickup device.

Moreover, when images are reduced by thinning processing in basic array pattern C units, the color filter array of the thinning processed reduced image can be made similar to the color filter array prior to thinning processing, enabling a common processing circuit to be employed.

Feature (2)

The color filter 30 illustrated in FIG. 2 has the G filter, that corresponds to the color contributing the most to obtaining a brightness signal (the color G in the present exemplary embodiment), placed in each line in the horizontal direction, vertical direction and diagonal directions of the color filter array.

The G filter corresponding to the brightness system pixels are placed in every line in the horizontal direction, vertical direction and diagonal directions of the color filter array, thereby enabling the reproduction precision of synchronization processing to be raised in the high frequency region, irrespective of the high frequency direction.

Feature (3)

In the color filter 30 illustrated in FIG. 2, the R filter and B filter, that correspond to the two or more other colors than the G color (the R and B colors in the present exemplary embodiment), are placed in each line in the horizontal direction and vertical direction of the color filter array.

The R filter and B filter are placed in each line in the horizontal direction and vertical direction of the color filter array, thereby enabling color moire (false color) generation to be suppressed. Thus an optical low pass filter for suppressing false color generation may be omitted from placement on the optical path of the optical system from the incident face to the imaging plane. Moreover, even in cases in which an optical low pass filter is applied, one can be employed that has a weak action to cut the high frequency components to prevent false color generation, enabling deterioration of resolution to be avoided.

The basic array pattern C such as illustrated in FIG. 2 can be considered as an array of alternate first array pattern A and second array pattern B in the horizontal direction and vertical direction, wherein the first array pattern A is the 3×3 pixels surrounded by the frame of the broken line, and the second array pattern B is the 3×3 pixels surrounded by the frame of the single dot intermittent line.

The first array pattern A and the second array pattern B both have the G filters for the respective brightness system pixels placed at their 4 corners and center, so as to be placed along their two diagonals. Moreover, in the first array pattern A, the B filters are arrayed in the horizontal direction on each side of the central G filter, and the R filters are arrayed in the vertical direction. However, in the second array pattern B, the R filters are arrayed on each side of the central G filter in the horizontal direction, and the B filters are arrayed in the vertical direction. Namely, the first array pattern A and the second array pattern B have reverse positional relationships for the R filters and the B filters, but have the same placement otherwise.

Figure 12:
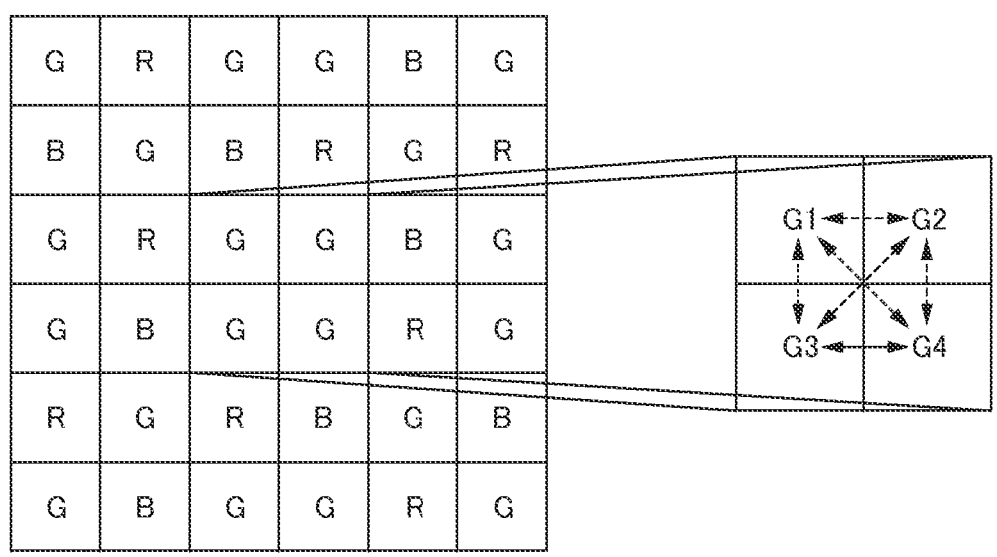
FIG. 12 is a diagram to explain a method for determining a correlation direction from pixel values of 2×2 pixels of G pixels contained in a color filter.

Moreover, the G filters at the 4 corners of the first array pattern A and the second array pattern B configure G filters that are arrayed in a square array corresponding to 2×2 pixels by disposing the first array pattern A and the second array pattern B alternately along the horizontal and vertical directions as illustrated in FIG. 12.

Feature (4)

The color filter 30 illustrated in FIG. 2 contains a square array corresponding to 2×2 pixels formed from the G filters.

As illustrated in FIG. 12, by extracting the 2×2 pixels formed from the G filters, and deriving the difference in absolute value of the pixel values of the G pixels in the horizontal direction, the difference in absolute value of the pixel values of the G pixels in the vertical direction, and the difference in absolute value of the pixel values of the G pixels in the diagonal directions (sloping up to the right and sloping up to the left), determination can be made that there is correlation in the direction with the smallest difference in absolute value out of the horizontal direction, vertical direction and diagonal directions.

Namely, according to the color filter array, the data of the G pixels with the smallest inter pixel separations are employed, thereby enabling determination of the direction with the highest correlation out of the horizontal direction, vertical direction and diagonal directions. The result of this directional determination can then be employed in interpolation processing from the peripheral pixels (synchronization processing).

Feature (5)

The basic array pattern C of the color filter 30 illustrated in FIG. 2 has point symmetry about the center of the basic array pattern C (the center of the 4 G filters). Moreover, as illustrated in FIG. 2, the first array pattern A and the second array pattern B inside the basic array pattern C also each have respective point symmetry about the G filters at their respective centers.

Such symmetry enables the circuit scale of a later stage processing circuit to be made smaller and to be simplified.

Figure 13:
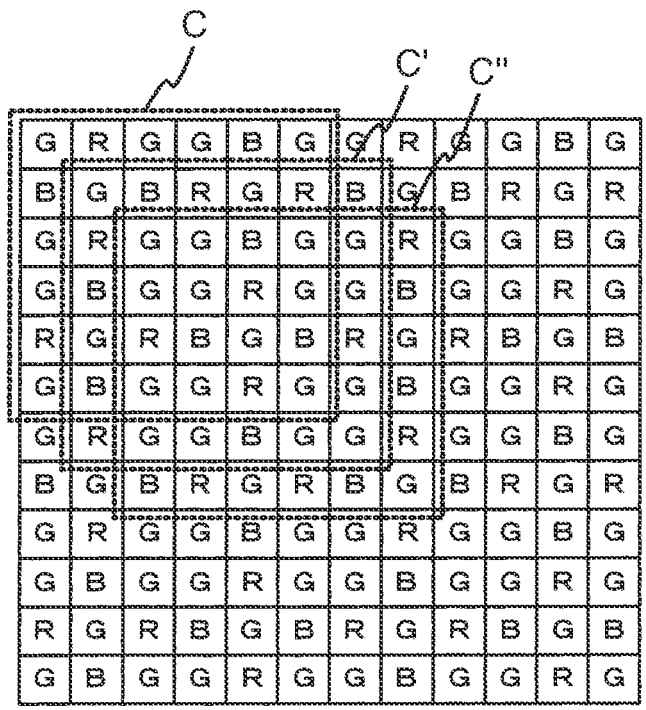
FIG. 13 is a diagram to explain the principles of a basic array pattern contained in a color filter.

In the basic array pattern C as illustrated in FIG. 13, the color filter arrays of the first and third lines out of the first to sixth horizontal direction lines are GRGGBG, the color filter array of the second line is BGBRGR, the color filter arrays of the fourth and sixth lines are GBGGRG, and the color filter array of the fifth line is RGRBGB.

In FIG. 13, taking a shifted basic array pattern C' as the basic array pattern C shifted respectively by 1 pixel each in the horizontal direction and vertical direction, and a shifted basic array pattern C" shifted respectively by 2 pixels each, then the same color filter array results from repeatedly disposing the basic array pattern C', C" along the horizontal direction and vertical direction.

Namely, plural basic array patterns exist that enable configuration of the color filter array illustrated in FIG. 13 by repeatedly disposing basic array patterns in the horizontal direction and vertical direction. In the present exemplary embodiment, the basic array pattern C that is the basic array pattern with point symmetry is, for convenience, referred to as the basic array pattern.

Figure 3:
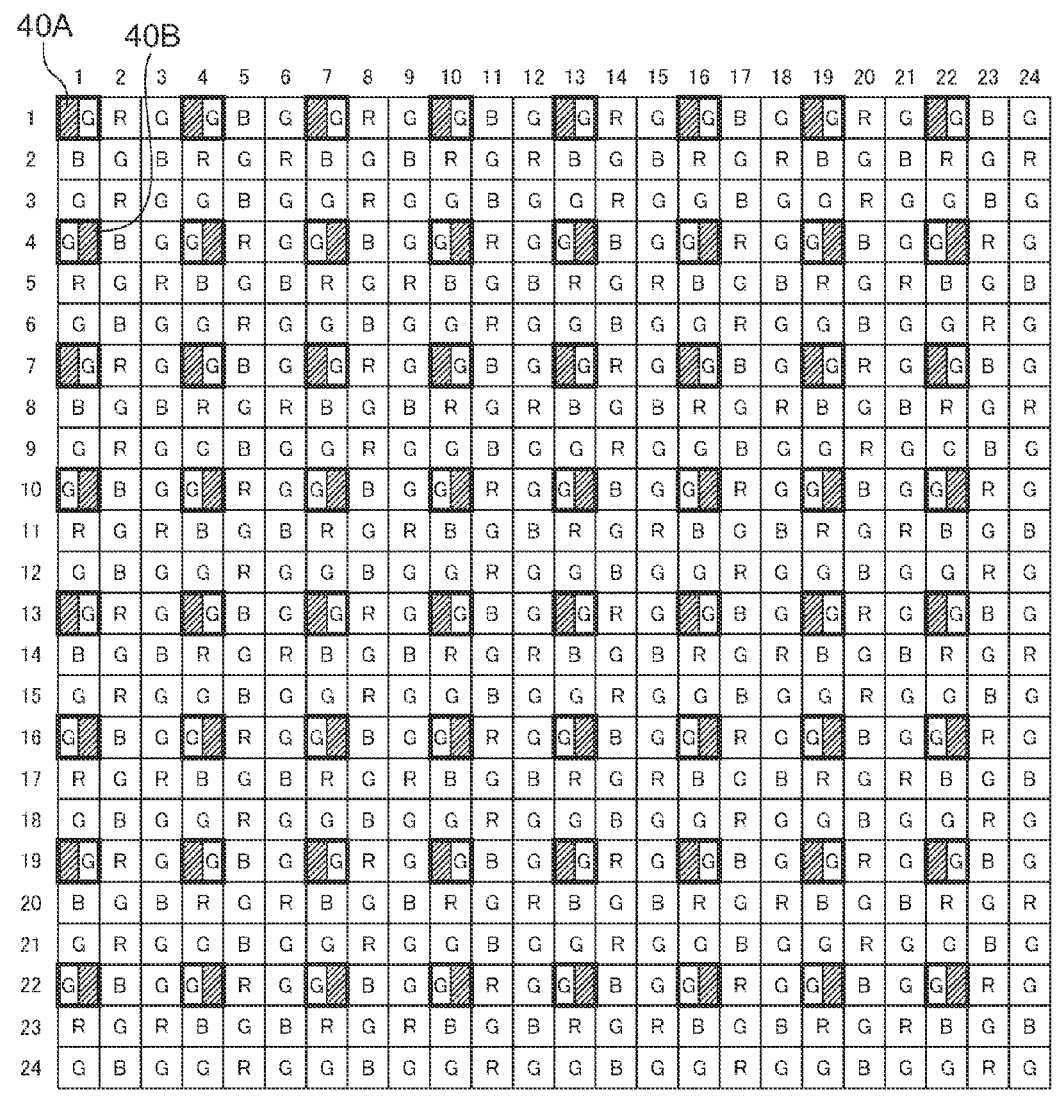

In order to perform AF control in the imaging apparatus 10 with what is referred to as a phase difference method, the image pickup device 14 has phase difference detection pixels placed in a predetermined pattern. Light-blocking portions 40 containing light-blocking films 40A that block light to the horizontal direction left half of a pixel, and light-blocking films 40B that block light to the horizontal direction right half of a pixel are formed on the phase difference detection pixels as illustrated in FIG. 3. In phase difference AF control, a phase shift amount is detected based on pixel data from the phase difference detection pixels provided with the light-blocking films 40A and based on pixel data from the phase difference detection pixels provided with the light-blocking films 40B. The focal position of the imaging lens is then adjusted based thereon.

In the light-blocking portions 40, in the present exemplary embodiment, as illustrated in FIG. 3, the phase difference detection pixels provided with the G filters are respectively provided at the top left corner portions of the first array pattern A and the second array pattern B in the 2 pairs thereof configuring the basic array pattern C, and are placed in all of the basic array patterns C. Namely, in the example of FIG. 3, the light-blocking films 40A are placed in the $(6n+1)^{th}$ vertical direction lines, and the light-blocking films 40B are placed in the $(6n+1)^{th}$ vertical direction lines. Note that in FIG. 3, the light-blocking portions 40 are provided in all of the basic array patterns C, however there is no limitation thereto, and they may only be provided in the basic array patterns C within a specific region of a section of the image pickup device. This also applies to other exemplary embodiments below.

The color filter 30 according to the present exemplary embodiment is thereby configured with the light-blocking portions 40 provided on the phase difference detection pixels where the G filters are provided at the left top corner portions of all the first array pattern A and the second array pattern B, such that the phase difference detection pixels are regularly placed at 1 pixel out of 3 pixels in both the vertical direction and the horizontal direction. There are accordingly comparatively many normal pixels placed at the periphery of the phase difference detection pixels, thereby enabling the interpolation precision to be raised during interpolation of pixel data of the phase difference detection pixels from the pixel data of the normal pixels.

The image capture processing section 16 subjects the image capture signals that have been output from the image pickup device 14 to predetermined processing, such as amplification processing and correlated double sampling, and A/D conversion processing, then outputs these as pixel data to the image processing section 20.

The image processing section 20 subjects the pixel data that has been output from the image capture processing section 16 to what is referred to as synchronization processing. Namely, for all the pixels, interpolation is performed of pixel data for colors other than the corresponding respective color from pixel data of peripheral pixels, so as to generate R, G, B pixel data for all pixels. Then, what is referred to as YC conversion processing is performed to the generated R, G, B pixel data, to generate brightness data Y and color difference data Cr, Cb. Then resizing processing is performed to re-size these signals to a size according to the image capture mode.

The drive section 22 performs for example driving to read image capture signals from the image pickup device 14 according to instruction from the controller 24.

The controller 24 performs overall control of the drive section 22 and the image processing section 20 according to the image capture mode. Although discussed in detail later, put briefly the controller 24 instructs the drive section 22 to read image capture signals with a reading method corresponding to the image capture mode, and instructs the image processing section 20 to perform image processing corresponding to the image capture mode.

Since, depending on the image capture mode, there is a need to read thinned image capture signals from the image pickup device 14, the controller 24 instructs the drive section 22 so as to thin and read image capture signals using a thinning method corresponding to the instructed image capture mode.

Included as image capture modes are a still image mode that captures still images, and video modes such as an HD video mode that thins the captured image and generates High Definition (HD) video data at a comparatively high definition and records this on a recording medium such as a memory card, not illustrated in the drawings, and a through video mode (live view mode) in which a captured image is thinned and a through video of comparatively low definition is output to a display section, not illustrated in the drawings.

Figure 4:
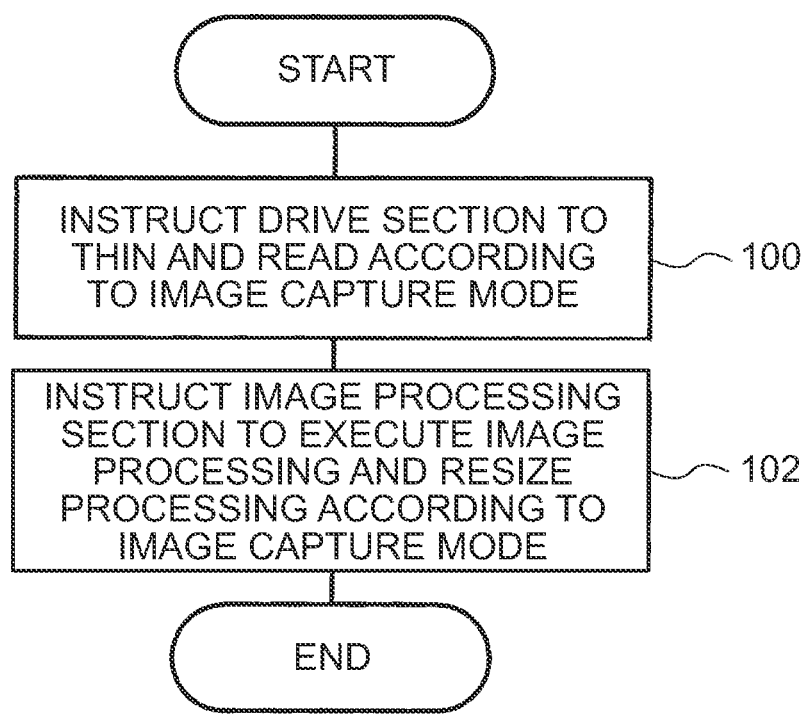
FIG. 4 is a flow chart of processing executed in a controller.

Explanation next follows of operation of the present exemplary embodiment, regarding processing executed by the controller 24, with reference to the flow chart of FIG. 4.

Note that the processing illustrated in FIG. 4 is executed when execution of imaging corresponding to the image capture mode is instructed.

First, at step 100, the drive section 22 is instructed to read pixel data by a thinning method corresponding to the image capture mode.

For example, for a video mode such as a HD video mode or through video mode, since video data is generated while performing phase difference AF control, phase difference detection pixels are read from lines in at least a section provided with the light-blocking films 40A and the light-blocking films 40B, namely, the $(6n+1)^{th}$ and $(6n+4)^{th}$ horizontal direction lines in FIG. 3 (wherein n=0, 1, 2, and so on). Phase difference AF control is performed based on the pixel data of the phase difference detection pixels of these lines, and the other lines $(6n+2)^{th}$, $(6n+3)^{th}$, $(6n+5)^{th}$ and $(6n+6)^{th}$, namely at least some of the normal pixel lines, are read and video data generated. During generation of this video data, interpolation is performed for the phase difference detection pixels from the pixel data of the normal pixels in their periphery.

As illustrated in FIG. 3, the present exemplary embodiment is configured with the phase difference detection pixels regularly placed at 1 pixel out of 3 pixels in both the vertical direction and the horizontal direction. There are accordingly comparatively many of the normal pixels at the periphery of the phase difference detection pixels, thereby enabling the interpolation precision to be raised when pixel data for the phase difference detection pixels is interpolated from the pixel data for normal pixels.

At step 102, the image processing section 20 is instructed to execute image processing (synchronization processing and YC conversion processing) and resizing processing corresponding to the imaging mode.

Note that the controller 24 may be configured with a computer that includes a CPU, ROM, RAM and non-volatile ROM. In such cases a processing program for the above processing may, for example, be pre-stored on the non-volatile ROM, and then executed by reading into the CPU.

Note that in the present exemplary embodiment, as illustrated in FIG. 3, 5A, explanation is given of a case in which horizontal direction array lines placed with the light-blocking films 40A are alternately disposed in the vertical direction with horizontal direction array lines placed with the light-blocking films 40B. However, as illustrated in FIG. 5B, configuration may be made with array lines of the light-blocking films 40A and the light-blocking films 40B alternately placed in this sequence along the horizontal direction, alternately disposed in the vertical direction with array lines of the light-blocking films 40B and the light-blocking films 40A alternately placed in this sequence along the horizontal direction. Note that only the phase difference detection pixels are illustrated in FIG. 5A and FIG. 5B. In the placement illustrated in FIG. 5B, since this results in diagonal placement of both the light-blocking films 40A and the light-blocking films 40B, it is possible to focus with good precision when for example capturing an image of a subject that contains diagonal lines. This also applies in the following exemplary embodiments.

Second Exemplary Embodiment

Explanation next follows regarding a second exemplary embodiment of the present invention. Note that the same reference numerals are allocated to portions similar to those of the first exemplary embodiment, and detailed explanation thereof is omitted.

FIG. 6 illustrates a placement of light-blocking films 40A, 40B according to the present exemplary embodiment. A point of difference of the present exemplary embodiment to the first exemplary embodiment is the placement of the light-blocking films 40A, 40B.

As illustrated in FIG. 6, in the present exemplary embodiment the light-blocking portions 40 are provided in each of a first array pattern A and a second array pattern B of two pairs thereof that configure a basic array pattern C, with horizontal direction array lines of basic array patterns C that are placed with the light-blocking portions 40 alternating in the vertical direction with horizontal direction array lines of basic array patterns C that are not placed with the light-blocking portions 40. Namely, in the example illustrated in FIG. 6, there are the light-blocking films 40A placed in the $(12n+1)^{th}$ vertical direction lines, and there are the light-blocking films 40B placed in the $(12n+4)^{th}$ vertical direction lines.

In such cases, when the image capture mode is a video mode, the controller 24 reads pixel data of the phase difference detection pixels in the lines placed with the light-blocking films 40A, 40B and performs phase difference AF control, and also reads pixel data of normal pixels not placed with the light-blocking films 40A, 40B, such as for example the pixel data in the $(12n+7)^{th}$ to the $(12n+12)^{th}$ lines, and generates video data.

Thus in the present exemplary embodiment, the pixel data from the phase difference detection pixels is only employed for phase difference AF control, and is not used in generating video data and so there is no need for interpolation from the peripheral pixels. Moreover, the video data is generated from pixel data of normal pixels. Thus the processing speed for phase difference AF control can be raised in comparison to cases in which the phase difference detection pixels are generated based on video data. Moreover, the processing speed for video data generation can be raised in comparison to cases in which interpolated video data is generated.

Third Exemplary Embodiment

Explanation next follows regarding a third exemplary embodiment of the present invention. Note that the same reference numerals are allocated to portions similar to those of the above exemplary embodiment, and detailed description thereof is omitted.

FIG. 7 illustrates a placement of light-blocking films 40A, 40B according to the present exemplary embodiment. A point of difference of the present exemplary embodiment to the first exemplary embodiment is the placement of the light-blocking films 40A, 40B. Thinning driving is similar to that of the second exemplary embodiment.

As illustrated in FIG. 7, in the present exemplary embodiment the light-blocking portions 40 are provided in one pair of a first array pattern A and a second array pattern B that are in row in the horizontal direction out of two pairs of the array pattern A and the second array pattern B that configure a basic array pattern C, with horizontal direction array lines of the basic array patterns C that are placed with the light-blocking portions 40 disposed alternately in the vertical direction with horizontal direction array lines of the basic array patterns C that are not placed with the light-blocking portions 40. Namely, in the example illustrated in FIG. 7, the light-blocking films 40A, 40B are placed on the phase difference detection pixels at positions where the $(12n+1)^{th}$ and the $(12n+4)^{th}$ vertical direction lines intersect with the $(12m+4)^{th}$ and the $(12m+10)^{th}$ horizontal direction lines (m=0, 1, 2, and so on).

Therefore, since the normal pixels at the periphery of the phase difference detection pixels are increased in comparison to the second exemplary embodiment, the precision of interpolation can be raised, enabling image quality to be raised.

Fourth Exemplary Embodiment

Explanation next follows regarding a fourth exemplary embodiment of the present invention. Note that the same reference numerals are allocated to portions similar to those of the above exemplary embodiments, and detailed explanation thereof is omitted.

Figure 8:
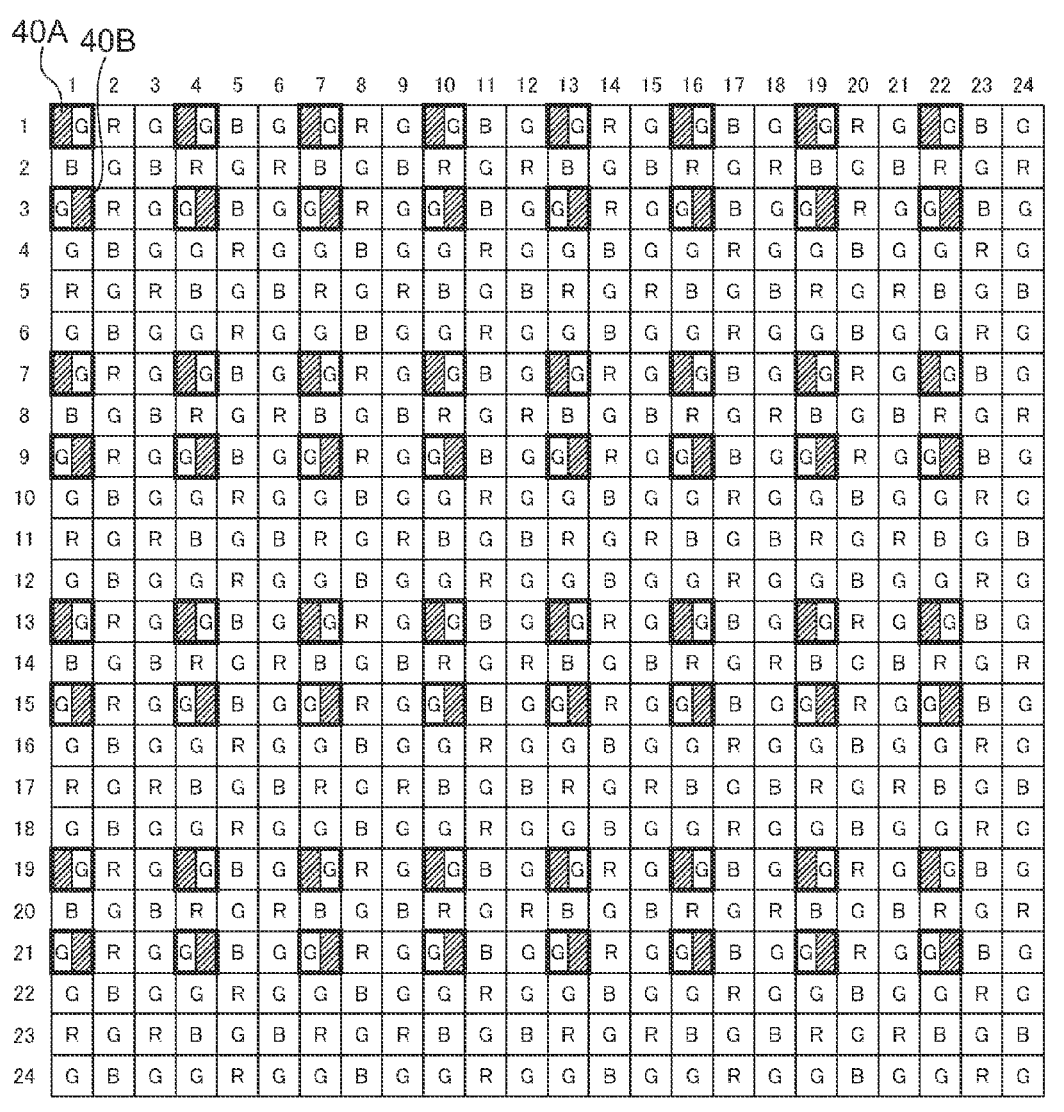

FIG. 8 illustrates a placement of the light-blocking films 40A, 40B according to the present exemplary embodiment. A point of difference of the present exemplary embodiment to the first exemplary embodiment is the placement of the light-blocking films 40A, 40B.

As illustrated in FIG. 8, in the present exemplary embodiment, the light-blocking portions 40 are provided on each of the phase difference detection pixels of 2 corner portions at one horizontal direction side (the left side) out of the 4 corners of one pair of a first array pattern A and a second array pattern B that are next to each other in the horizontal direction, and are placed in all the basic array patterns C. Namely, in the example of FIG. 8, the light-blocking films 40A are placed in the $(6n+1)^{th}$ vertical direction lines and the light-blocking films 40B are placed in the $(6n+3)^{th}$ vertical direction lines.

During performing phase difference AF control, the AF control has better precision the closer the phase difference detection pixels are to each other and when the placement direction of the phase difference detection pixels is the vertical direction. Accordingly, in the present exemplary embodiment, as illustrated in FIG. 8, the separation of the light-blocking films 40A, 40B is made narrower and closer together in the vertical direction, thereby enabling the precision of phase difference AF control to be raised.

Fifth Exemplary Embodiment

Explanation next follows regarding a fifth exemplary embodiment of the present invention. Note that the same reference numerals are allocated to portions similar to those of the above exemplary embodiments, and detailed explanation thereof is omitted.

FIG. 9 illustrates a placement of the light-blocking films 40A, 40B according to the present exemplary embodiment. A point of difference of the present exemplary embodiment to the first exemplary embodiment is the placement of the light-blocking films 40A, 40B. The thinning driving is similar to that of the second exemplary embodiment.

As illustrated in FIG. 9, in the present exemplary embodiment the light-blocking portions 40 are provided on each of the phase difference detection pixels of 2 corner portions at one horizontal direction side (the left side) out of the 4 corners of one pair of a first array pattern A and a second array pattern B that are next to each other in the horizontal direction, and are disposed with horizontal direction array lines of basic array patterns C placed with the light-blocking portions 40, alternating in the vertical direction with horizontal direction array lines of basic array patterns C that are not placed with the light-blocking portions 40. Namely, in the example illustrated in FIG. 9, there are the light-blocking films 40A placed in the $(12n+1)^{th}$ vertical direction lines and the light-blocking films 40B placed in the $(12n+3)^{th}$ vertical direction lines.

In such a case, similarly to in the second exemplary embodiment, when the image capture mode is a video mode, the controller 24 reads pixel data of the phase difference detection pixels in the lines placed with the light-blocking films 40A, 40B and performs phase difference AF control, and also reads pixel data of normal pixels not placed with the light-blocking films 40A, 40B, such as for example the pixel data in the $(12n+7)^{th}$ to the $(12n+12)^{th}$ lines, and generates video data.

Thus in the present exemplary embodiment, the pixel data from the phase difference detection pixels is only employed for phase difference AF control, and is not used in generating video data and so the there is no need for interpolation from the peripheral pixels. Moreover, the video data is generated from pixel data of normal pixels. Thus the processing speed for phase difference AF control can be raised in comparison to cases in which the phase difference detection pixels are based on video data generation. Moreover, the processing speed for video data generation can be raised in comparison to cases in which interpolated video data is generated.

Sixth Exemplary Embodiment

Explanation next follows regarding a sixth exemplary embodiment of the present invention. Note that the same reference numerals are allocated to portions similar to those of the above exemplary embodiments, and detailed explanation thereof is omitted.

Figure 10:
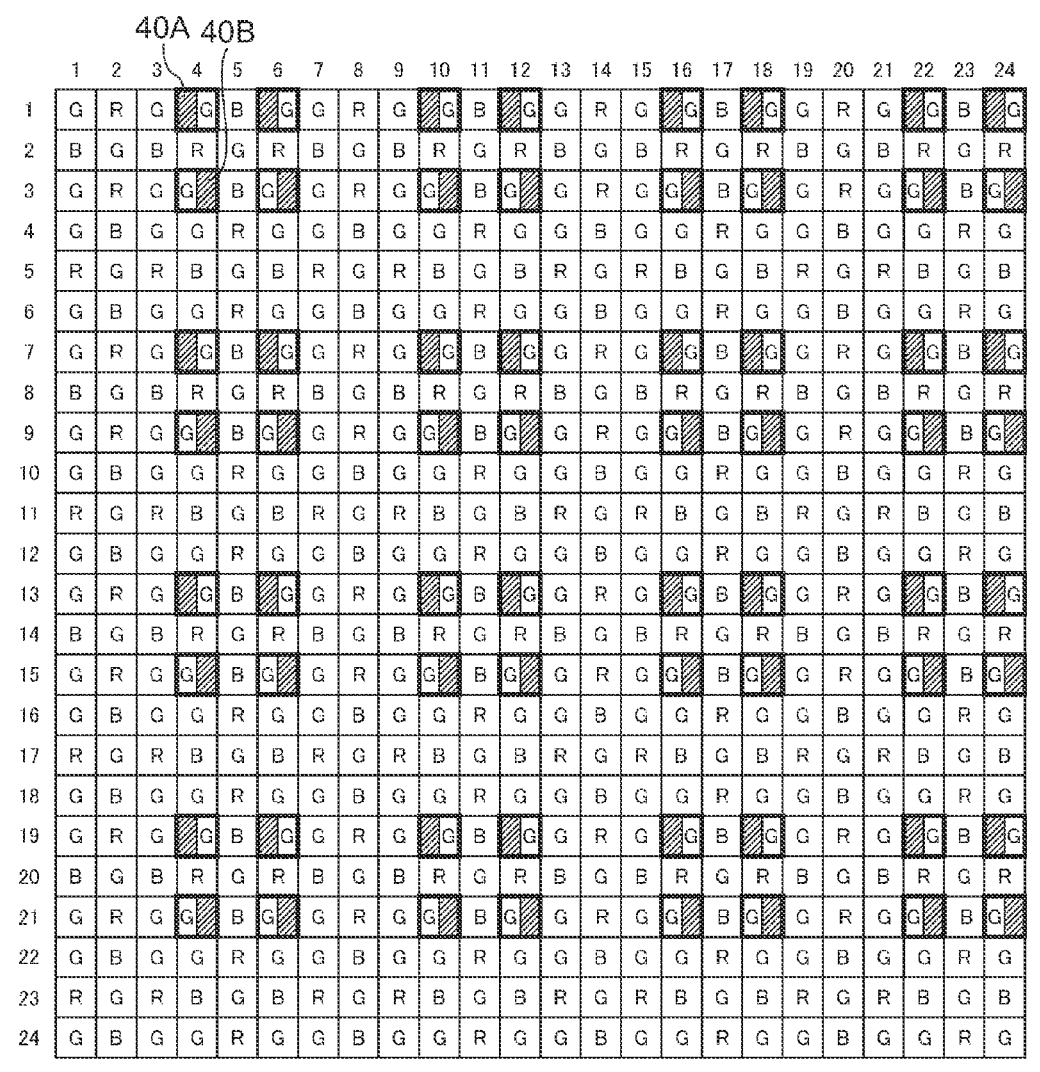

FIG. 10 illustrates a placement of the light-blocking films 40A, 40B according to the present exemplary embodiment. A point of difference of the present exemplary embodiment to the first exemplary embodiment is the placement of the light-blocking films 40A, 40B.

As illustrated in FIG. 10, in the present exemplary embodiment the light-blocking portions 40 are provided on each of the phase difference detection pixels of 4 corner portions of one array pattern from a first array pattern or a second array pattern (the second array pattern B at the top right side in FIG. 10) out of 2 pairs of the first array pattern A and the second array pattern B that configure a basic array pattern C, and are placed in all the basic array patterns C. Namely, in the example illustrated in FIG. 10, the light-blocking films 40A, 40B are placed on the phase difference detection pixels at positions where the $(6n+1)^{th}$ and the $(6n+3)^{th}$ vertical direction lines intersect with the $(6m+4)^{th}$ and the $(6m+6)^{th}$ horizontal direction lines (m=0, 1, 2, and so on).

In such cases, for example the image quality of a through video can be raised since there is little thinning.

Note that in each of the above exemplary embodiments, explanation has been given of examples of color filter arrays with the 3 primary color RGB color filters, however the types of color filter are not limited thereto.

Moreover, in each of the above exemplary embodiments, explanation has been given of configurations in which the phase difference detection pixels are provided with the light-blocking films 40A that block light to the horizontal direction left half of pixels or the light-blocking films 40B that block light to the horizontal direction right half of pixels, however there is no limitation to these light-blocking regions, as long as the light-blocking films 40A block light to a region that is a part of the phase difference detection pixels and let light through to other regions, and the light-blocking films 40B block light to part of the phase difference detection pixels and let light pass through in a region that forms a pair with the light-pass region of the light-blocking films 40A.

Figure 11:
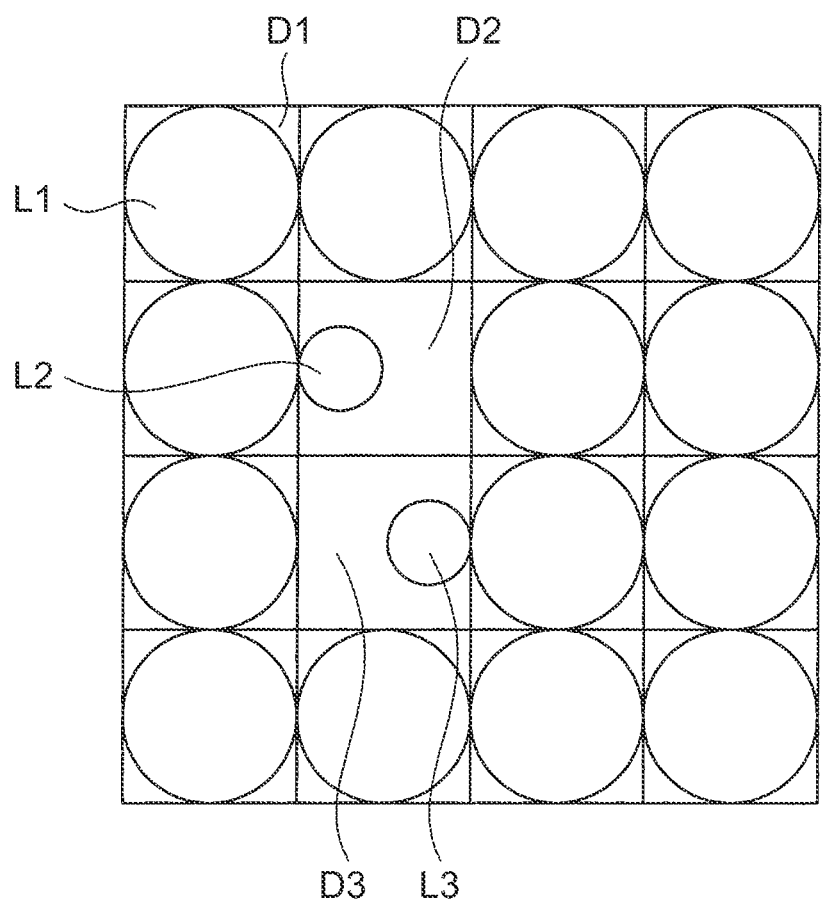
FIG. 11 is a diagram to explain a modified example of phase difference detection pixels.

Moreover, in each of the above exemplary embodiments, explanation has been given of a configuration in which the light-blocking films are provided on the phase difference detection pixels, however there is no limitation thereto. For example, the phase difference detection pixels may be formed by adopting the configuration described in Japanese Patent Application 2009-227338. Namely, a configuration in which an image pickup device is configured by top microlenses, inner microlenses, and the light receiving elements of similar shape, configured to include first pixels D1 that receive light rays that have passed through the entire region of the imaging lens eye, second pixels D2 that receive only light rays that passed through a portion of a half region of the imaging lens eye, and third pixels D3 that receive only light rays that have passed through a portion of a half region of the imaging lens eye that is different to the second pixels D2. Then, as illustrated in FIG. 11, top microlenses L2, L3 are disposed on the second pixels D2 and the third pixels D3, the top microlenses L2, L3 having a smaller diameter than top microlenses L1 for the first pixels D1 and being respectively shifted in different directions with respect to the optical axes of the inner microlenses. The top microlenses and the light receiving elements are disposed shifted with respect to each other. The second pixels D2 and the third pixels D3 can accordingly be formed in this manner as the phase difference detection pixels. The present invention is also applicable to such a configuration. Moreover, depending on the configuration of the image pickup device, an embodiment may also be implemented without provision of the inner lenses. Moreover, the configuration of the phase difference pixels is not limited to the configuration described above, and it is possible to substitute any configuration capable of partitioning the eye.

Seventh Exemplary Embodiment

Explanation next follows regarding a seventh exemplary embodiment of the present invention.

Since phase difference detection pixels have a lower sensitivity than normal pixels, and their characteristics are also differ, there is a need to correct the pixel data from phase difference detection pixels when the pixel data of the phase difference detection pixels is employed as imaging data for a still image or a video image. Explanation follows regarding a pixel data correction method for phase difference detection pixels in the present exemplary embodiment.

As correction methods, two types of method are known, average value correction and gain correction, and either may be employed. Average value correction is a method in which an average value of the pixel values of normal pixels at the periphery of the phase difference detection pixels is taken as pixel data for these phase difference detection pixels. Gain correction is a method by which pixel data for the phase difference detection pixels is raised by multiplying pixel data for the phase difference detection pixels by a specific gain equivalent to the difference in level between the normal pixels and the phase difference detection pixels.

Specific explanation follows regarding a case in which pixel data of phase difference detection pixels is corrected by average value correction.

Figure 14:
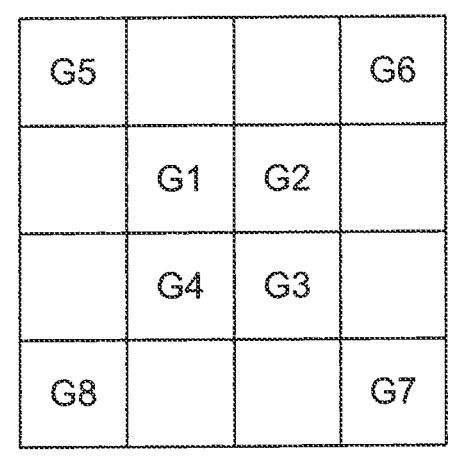

FIG. 14 illustrates G pixel placement within 4×4 pixels centered on 2×2 G pixels at the center of a basic array pattern C. The central 2×2 G pixels in FIG. 14 are respectively G1, G2, G3, G4, clockwise from the top left, and the G pixels peripheral thereto are respectively G5, G6, G7, G8, clockwise from the top left.

In cases in which the phase difference detection pixels are placed as illustrated in FIG. 3, FIG. 6 and FIG. 7, the G3 pixel in FIG. 14 is a phase difference detection pixel.

Moreover, in cases in which the phase difference detection pixels are placed as illustrated in FIG. 8 and FIG. 9, the G2 or the G3 pixel in FIG. 14 is a phase difference detection pixel.

Moreover, in cases in which the phase difference detection pixels are placed as illustrated in FIG. 10, the G1, G2, G3 and G4 pixels in FIG. 14 are phase difference detection pixels.

In cases in which the pixel data of the G1 pixel serving as a phase difference detection pixel is employed as image data, the average value of the pixel data of peripheral normal pixels, for example each of the G2, G4, G5 pixels, is taken as the pixel data for the G1 pixel.

Moreover, in cases in which the pixel data of the G2 pixel serving as a phase difference detection pixel is employed as image data, the average value of the pixel data of peripheral normal pixels, for example each of the G1, G3, G6 pixels, is taken as the pixel data for the G2 pixel.

Moreover, in cases in which the pixel data of the G3 pixel serving as a phase difference detection pixel is employed as image data, the average value of the pixel data of peripheral normal pixels, for example each of the G2, G4, G7 pixels, is taken as the pixel data for the G3 pixel.

Moreover, in cases in which the pixel data of the G4 pixel serving as a phase difference detection pixel is employed as image data, the average value of the pixel data of peripheral normal pixels, for example each of the G1, G3, G8 pixels, is taken as the pixel data for the G4 pixel.

Average value correction for the pixel data of phase difference detection pixels is accordingly performed as above based on the pixel data of the peripheral normal pixels.

Note that whether a better image is obtained by performing gain correction or average value correction sometimes differs depending on the contents of the captured image. Consequently, use of gain correction or average value correction may be chosen according to the contents of the captured image.

Eighth Exemplary Embodiment

Explanation next follows regarding an eighth exemplary embodiment of the present invention. Note that the same reference numerals are allocated to portions similar to the first exemplary embodiment, and detailed explanation thereof is omitted.

FIG. 15 illustrates a placement of the light-blocking films 40A, 40B according to the present exemplary embodiment. A point of difference of the present exemplary embodiment to the first exemplary embodiment is the placement of the light-blocking films 40A, 40B.

As illustrated in FIG. 15, in the present exemplary embodiment, a light-blocking film 40A is placed on a pixel (a first phase difference detection pixel) corresponding to 1 corner portion (the left bottom corner portion in FIG. 15) out of the 4 corners of at least one array pattern from 1 pair of a first array pattern A and a second array pattern B (the first array pattern A and the second array pattern B in FIG. 15) out of 2 pairs of the first array pattern A and the second array pattern B that configure a basic array pattern C.

Moreover, out of the 2 pairs of a first array pattern A and a second array pattern B that configure a basic array pattern C adjacent in the vertical direction to the basic array pattern C placed with the light-blocking films 40A, a light-blocking film 40B is placed in the position of a pixel (the second phase difference detection pixel) corresponding to the 1 corner portion (the top left corner portion in FIG. 15) out of the 4 corners of the array pattern at the same position in the horizontal direction as the array pattern placed with the light-blocking films 40A.

Namely, in the example of FIG. 15, the light-blocking films 40A are placed in the $(12n+3)^{th}$ vertical direction lines (n=0, 1, 2 and so on) and the light-blocking films 40B are placed in the $(12n+7)^{th}$ vertical direction lines.

In such cases, in cases in which a video mode is the image capture mode, the controller 24 generates video data by excluding the lines in which the light-blocking films 40A, 40B are placed, and reading pixel data from the lines of normal pixels not placed with the light-blocking films 40A, 40B, for example the $(2n+2)^{th}$ line. Namely, video data is generated by reading line image data from vertical direction even numbered lines.

Thus, in the present exemplary embodiment, placing the light-blocking films 40A and the light-blocking films 40B in the vertical direction odd numbered lines enables video data to be generated by reading line image data from the vertical direction even numbered lines.

Moreover, as illustrated in FIG. 15, either the light-blocking films 40A or the light-blocking films 40B are placed in 2×2 G pixels, and there are many of the same colored normal pixels, these being G pixels, at the periphery thereof. Hence, in for example a still image mode, in cases in which pixel data from phase difference detection pixels is also employed to generate image data, the interpolation precision can be raised when interpolating pixel data for the phase difference detection pixels from the pixel data of the normal pixels.

Moreover, since each of the light-blocking films 40A and each of the light-blocking films 40B that form each respective pair are in the same horizontal direction positions, the AF precision using the phase difference detection pixels can be raised.

Moreover, the light-blocking films 40A are placed at the corner portions on the vertical direction lower side out of the 4 corner portions of the first array pattern A, and the light-blocking films 40B that form respective pairs with the light-blocking films 40A are placed at corner portions on the vertical direction upper side out of the 4 corner portions of the first array pattern A. Hence the AF precision using the phase difference detection pixels can be raised in comparison to cases in which the light-blocking films 40B are placed similarly to the light-blocking films 40A at the corner portions on the vertical direction lower side out of the 4 corner portions of the first array pattern A, due to the vertical direction separation between the pairs of light-blocking films 40A and light-blocking films 40B being closer together.

Moreover, explanation has been given in the present exemplary embodiment of a case in which line image data is read with thinning only performed in the vertical direction, however reading may be performed with thinning in the horizontal direction. For example, in cases in which the phase difference detection pixels are only placed on horizontal direction odd numbered lines, configuration may be made such that only the pixels on the horizontal direction even numbered lines are read as video data. However, in cases in which the phase difference detection pixels are placed only on the horizontal direction even numbered lines, configuration may be made such that only the pixels on the horizontal direction odd numbered lines are read as video data.

Moreover, although explanation has been given in the present exemplary embodiment of a case in which the light-blocking films 40A are placed on the $(12n+3)^{th}$ vertical direction lines and the light-blocking films 40B are placed on the $(12n+7)^{th}$ vertical direction lines (n=0, 1, 2, and so on), there is no limitation thereto.

For example, as illustrated in FIG. 16, configuration may be made such that the light-blocking films 40A are placed in the $(12n+1)^{th}$ vertical direction lines and the light-blocking films 40B are placed on the $(12n+7)^{th}$ vertical direction lines Moreover, configuration may be made as illustrated in FIG. 17 with the light-blocking films 40A placed in the $(12n+3)^{th}$ vertical direction lines and the light-blocking films 40B are placed on the $(12n+9)^{th}$ vertical direction lines.

Moreover, configuration may be made as illustrated in FIG. 18 with the light-blocking films 40A placed in the $(12n+4)^{th}$ vertical direction lines (n=0, 1, 2, and so on) and the light-blocking films 40B are placed on the $(12n+10)^{th}$ vertical direction lines.

Figure 19:
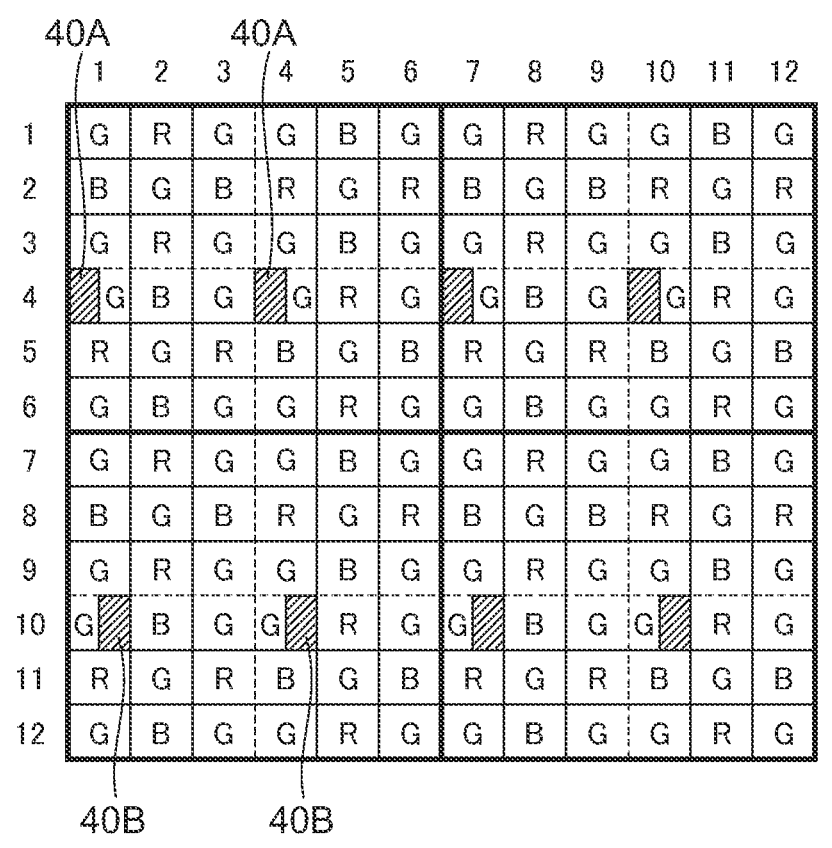

Moreover, configuration may be made as illustrated in FIG. 19 with the light-blocking films 40A placed in the $(12n+6)^{th}$ vertical direction lines (n=0, 1, 2, and so on) and the light-blocking films 40B are placed on the $(12n+12)^{th}$ vertical direction lines.

Note that in cases in which, as illustrated in FIG. 18 and FIG. 19, the light-blocking films 40A and the light-blocking films 40B are placed in the vertical direction even numbered lines, video data is generated by reading the line image data of the vertical direction odd numbered lines.

What is claimed is:
1. A color image pickup device comprising:
an image pickup device comprising a plurality of photoelectric conversion elements arrayed in a horizontal direction and a vertical direction;
a color filter that is provided above a plurality of pixels configured by the plurality of photoelectric conversion elements, the color filter having repeatedly disposed 6×6 pixel basic array patterns configured with a first array pattern and a second array pattern disposed symmetrically about a point, wherein the first array pattern has a first filter corresponding to a first color that contributes most to obtaining a brightness signal placed at the 4 corner and center pixels of a 3×3 pixel square array, a second filter corresponding to a second color different from the first color placed in a line at the horizontal direction center of the square array, and a third filter corresponding to a third color different from the first color and the second color placed in a line at the vertical direction center of the square array, and the second array pattern has the same placement of the first filter as that in the first array pattern and has the placement of the sec- ond filter and the placement of the third filter swapped over to that of the first array pattern;
a first phase difference detection pixel that is placed at a position of a pixel corresponding to 1 corner portion out of 4 corner portions of the 4 corners of an array pattern in 1 pair of the first array pattern and the second array pattern out of 2 pairs of the first array pattern and the second array pattern configuring a first basic array pattern of the basic array patterns; and
a second phase difference detection pixel that is placed at a position of a pixel corresponding to 1 corner portion out of 4 corner portions of the 4 corners in an array pattern out of the first array pattern and the second array pattern configuring a second basic array pattern of the basic array patterns that is adjacent in the vertical direction to the first basic array pattern including the first phase difference detection pixel, so that the array pattern including the second phase difference detection pixel is disposed in the same horizontal direction position to the array pattern including the first phase difference detection pixel.

2. The color image pickup device of claim 1, wherein the horizontal direction positions of the first phase difference detection pixel and the second phase difference detection pixel are the same as each other.

3. The color image pickup device of claim 1, wherein the first phase difference detection pixel is placed in a corner portion at one vertical direction side out of the 4 corner portions of the array pattern including the first phase difference detection pixel, and the second phase difference detection pixel is placed in a corner portion at the other vertical direction side out of the 4 corner portions of the array pattern including the second phase difference detection pixel.

4. The color image pickup device of claim 1, wherein a first light-blocking film is provided to the first phase difference detection pixel to block light to a region that is a part of the first phase difference detection pixel and to let light pass through a first light-pass region, and a second light-blocking film is provided to the second phase difference detection pixel to block light to part of the pixel and to let light pass through a second light-pass region that forms a pair with the first light-pass region.

5. The color image pickup device of claim 4, wherein the first light-blocking film blocks light to a pixel horizontal direction left half region, and the second light-blocking film blocks light to a pixel horizontal direction right half region.

6. The color image pickup device of claim 1, wherein the first color is green (G), the second color is one color of red (R) or blue (B), and the third color is the other color of red (R) or blue (B).

7. An imaging apparatus comprising:
the color image pickup device of claim 1;
a drive section that drives the color image pickup device so as to read phase difference detection pixel data from the first phase difference detection pixel and the second phase difference detection pixel and so as to read pixel data for an image from pixels on vertical direction even numbered lines in cases in which the first phase difference detection pixel and the second phase difference detection pixel are placed on vertical direction odd numbered lines, and so as to read pixel data for an image from pixels on the vertical direction odd numbered lines in cases in which the first phase difference detection pixel and the second phase difference detection pixel are placed on the vertical direction even numbered lines; and
a focus adjustment section that adjusts focus based on phase difference detection pixel data.

8. The imaging apparatus of claim 7, wherein:
the drive section drives the color image pickup device so as to read pixel data for an image from pixels on horizontal direction even numbered lines in cases in which the first phase difference detection pixel and the second phase difference detection pixel are placed on horizontal direction odd numbered lines, and so as to read pixel data for an image from pixels on the horizontal direction odd numbered lines in cases in which the first phase difference detection pixel and the second phase difference detection pixel are placed on the horizontal direction even numbered lines.

9. A non-transitory storage medium storing a control program that causes processing to be executed in a computer to control an imaging apparatus equipped with a color image pickup device comprising:
an image pickup device comprising a plurality of photoelectric conversion elements arrayed in a horizontal direction and a vertical direction, a color filter that is provided above a plurality of pixels configured by the plurality of photoelectric conversion elements, the color filter having repeatedly disposed 6×6 pixel basic array patterns configured with a first array pattern and a second array pattern disposed symmetrically about a point, wherein the first array pattern has a first filter corresponding to a first color that contributes most to obtaining a brightness signal placed at the 4 corner and center pixels of a 3×3 pixel square array, a second filter corresponding to a second color different from the first color placed in a line at the horizontal direction center of the square array, and a third filter corresponding to a third color different from the first color and the second color placed in a line at the vertical direction center of the square array, and the second array pattern has the same placement of the first filter as that in the first array pattern and has the placement of the second filter and the placement of the third filter swapped over to that of the first array pattern;
a first phase difference detection pixel that is placed at a position of a pixel corresponding to 1 corner portion out of 4 corner portions of the 4 corners of an array pattern in 1 pair of the first array pattern and the second array pattern out of 2 pairs of the first array pattern and the second array pattern configuring a first basic array pattern of the basic array patterns; and
a second phase difference detection pixel that is placed at a position of a pixel corresponding to 1 corner portion out of 4 corner portions of the 4 corners in an array pattern out of the first array pattern and the second array pattern configuring a second basic array pattern of the basic array patterns that is adjacent in the vertical direction to the first basic array pattern including the first phase difference detection pixel, so that the array pattern including the second phase difference detection pixel is disposed in the same horizontal direction position to the array pattern including the first phase difference detection pixel; and
wherein the processing of the control program of the imaging apparatus comprises
driving the color image pickup device so as to read phase difference detection pixel data from the first phase difference detection pixel and the second phase detection pixel; and
adjusting focus based on the phase difference detection pixel data.

* * * * *